United States Patent [19]

Tashiro et al.

[11] Patent Number: 5,032,551
[45] Date of Patent: Jul. 16, 1991

[54] SILICON NITRIDE BASED CERAMIC FIBERS, PROCESS OF PREPARING SAME AND COMPOSITE MATERIAL CONTAINING SAME

[75] Inventors: Yuuji Tashiro; Osamu Funayama; Mikiro Arai, all of Iruma; Hiroyuki Aoki, Kamifukuoka; Takeshi Isoda; Hiroshihi Kaya, both of Niiza; Tadashi Suzuki; Toshio Katahata, both of Iruma; Mutsuo Haino, Kamifukuoka; Genshiro Nishimura, Iruma, all of Japan

[73] Assignee: Toa Nenryo Kogyo Kabushiki Kaisha, Japan

[21] Appl. No.: 318,175

[22] Filed: Mar. 2, 1989

[30] Foreign Application Priority Data

Mar. 5, 1988 [JP] Japan ................................. 63-52461
Mar. 24, 1988 [JP] Japan ................................. 63-68220

[51] Int. Cl.$^5$ ...................... C04B 35/02; C04B 35/58; C08F 283/00; C08G 77/04
[52] U.S. Cl. .......................... 501/95; 501/97; 525/474; 525/477; 528/25; 528/31
[58] Field of Search ................. 501/95, 97; 428/408; 525/474, 477, 442; 528/31

[56] References Cited

U.S. PATENT DOCUMENTS

| 3,853,567 | 12/1974 | Verbeck | 106/44 |
| 4,358,576 | 9/1982 | Yajima et al. | 528/30 |
| 4,482,669 | 11/1984 | Seyferth et al. | 524/442 |
| 4,482,689 | 11/1984 | Haluska | 428/408 |
| 4,604,367 | 8/1986 | Takamigawa et al. | 501/95 |
| 4,610,917 | 9/1986 | Yamamura et al. | 501/95 |
| 4,650,773 | 3/1987 | Okamura | 501/95 |
| 4,657,991 | 4/1987 | Takamizawa et al. | 528/477 |
| 4,705,837 | 11/1987 | Seyferth et al. | 528/31 |
| 4,762,895 | 8/1988 | Chandra et al. | 525/474 |
| 4,818,611 | 4/1989 | Arai et al. | 501/95 |

FOREIGN PATENT DOCUMENTS

| 0161751 | 11/1985 | European Pat. Off. | |
| 0175382 | 3/1986 | European Pat. Off. | |
| 6100168 | 8/1981 | Japan | 501/95 |
| 7305617 | 10/1973 | Netherlands | 501/95 |
| 0356264 | 11/1972 | U.S.S.R. | 501/95 |

OTHER PUBLICATIONS

Japanese Abstracts Aoki et al., 60-134025, "Heat Resistant Fiber and Its Production", Jul. 17, 1985.
Chemical Abstracts, vol. 104, No. 4: 114880h.
Chemical Abstracts, vol. 105, No. 18: 157761h.

Primary Examiner—William R. Dixon, Jr.
Assistant Examiner—Paul Marcantoni
Attorney, Agent, or Firm—Lorusso & Loud

[57] ABSTRACT

Silicon nitride based ceramic fibers containing Si, N, O and at least one metal M in amounts providing the atomic ratios N/Si of 0.3 to 3, O/Si of 0.0001 to 15 and M/Si of 0.001 to 5 and exhibiting an X-ray small angle scattering such that the ratio of the intensity of the small angle scattering of the fibers to that of air is 1 to 20. The ceramic fibers are produced by spinning of a polymetallosilazane into fibers and calcining the spun fibers and are useful as reinforcing fibers for composite artices having a metal or resin matrix.

17 Claims, No Drawings

SILICON NITRIDE BASED CERAMIC FIBERS, PROCESS OF PREPARING SAME AND COMPOSITE MATERIAL CONTAINING SAME

This invention relates to metal-containing silicon nitride ceramic fibers and a process for preparing same.

Ceramic fibers have been attracting much attention for their favorable properties such as high mechanical strengths and resistance to heat and chemicals and will find use for a variety of applications as reinforcing materials for various composite articles such as engine parts, fan blades and aircraft structures.

Japanese Examined Patent Publication No. 62-5201 discloses a fiber of a substantially amorphous Si-Ti-C-O ceramic obtained by spinning a polytitanocarbosilane, which is obtained by copolymerizing a polycarbosilane with polytitanosiloxane, into fibers and calcining the spun fibers. This silicon carbide based ceramic fibers, however, contain a relatively large amount of free carbon which can react with a molten metal such as aluminum and, hence, it is not suited for use as reinforcing fibers to be incorporated into the metal matrix.

The present invention is aimed at the provision of a novel inorganic fiber having a high mechanical strength and an excellent compatibility with a metal.

In accordance with one aspect according to the present invention there is provided an inorganic fiber formed of a ceramic containing Si, N, O and at least one metal M in amounts providing the following atomic ratios:
N/Si: 0.3 to 3,
O/Si: 0.001 to 15,
M/Si: 0.001 to 5.

In another aspect, the present invention provides a process for the production of ceramic fibers, comprising the steps of:
providing a polymetallosilazane;
spinning said polymetallosilazane into fibers; and
calcining said fibers.

The novel ceramic fibers according to the present invention have excellent mechanical properties and excellent compatibility with other ceramic materials, metals and polymers and, thus are useful as reinforcing materials for the production of composite articles having high mechanical strengths such as interlayer shear strength and impact strength.

The present invention will now be described in detail below.

It is important that the ceramic fiber should contain Si, N, O and at least one metal M in amounts providing the following atomic ratios:
N/Si: 0.3 to 3,
O/Si: 0.001 to 15,
M/Si: 0.001 to 5.
Proportions of these components outside of the above specified ranges cause reduction of mechanical strength of the fibers. The ceramic fiber of the present invention may further contain C and/or H in amounts providing the following atomic ratios:
C/Si: 7 or less
H/Si: 15 or less
Preferred atomic ratios are as follows:
N/Si: 0.6 to 1.4
O/Si: 0.01 to 10
M/Si: 0.01 to 2.5
C/Si: 3.5 or less
H/Si: 5 or less More preferred ranges are as follows:
N/Si: 1 to 1.3
O/Si: 0.01 to 4
M/Si: 0.01 to 1
C/Si: 3.5 or less
H/Si: 1 or less The metal M is preferably at least one element selected from those of the groups IIa, IIIa, IIIb, IVa IVb, Va and Vb of the Periodic Table. Illustrative of suitable metals are Be, Mg, Ca, Sr, Ba, Sc, Y, lanthanoid elements, actinoid elements, B, Al, Ga, In, Tl, Ti, Zr, Hf, Ge, Sn, Pb, V, Nb, Ta, As, Sb, and Bi. Above all, Y, B, Al, Ti and Zr are especially preferred.

It is preferred that the ceramic fibers show an X-ray small angle scattering such that the ratio of the intensity of the small angle scattering of the fibers to that of air is 1 to 20, more preferably 1 to 10, most preferably 1 to 5, at scattering angles 0.5° and 1°, for reasons of exhibiting mechanical strength suitable for reinforcing materials of composite articles.

The intensity of X-ray small angle scattering is related to the presence of fine pores or voids in the fibers. Namely, the presence of fine pores causes localization of electron density, accounting for small angle scattering.

According to Guinier theory, scattering intensity is expressed by the following equation:

$$I(h) = (\Delta\rho)^2 V^2 \exp(-h^2 R_g^2/3)$$

wherein
I(h): scattering intensity in vector quantity h in reciprocal space,
$\Delta\rho$: difference in electron density between voids and ambit,
Rg: radius of inertia,
V: volume of scattering body,
h: $(4 \sin\theta)/\lambda$,
$\lambda$: wavelength of X-ray,
$\theta$: scattering angle.

Thus, since the scattering intensity I(h) at a scattering angle $\theta$ is proportional to the volume of voids with the radius of inertia of Rg, it can be used as a measure of the amount of the voids of the fibers upon a suitable density compensation.

Measurement of a small angle scattering intensity is generally made in accordance with the method described in "Experimental Chemistry Course, No. 4, Soild Physics" (1956), Japan Chemical Society. For the purpose of the present specification, the following method is adopted:

Using an X-ray small angle scattering measurement device (RJ-200B, manufactured by Rigaku Denki K.K., Japan) equipped with a position sensor proportional counter (PSPC-5), scattering intensity is measured while integrating for 1000 seconds in every 0.02° at a tube voltage of 45 KV, a tube current of 95 mA with two first and second slits of 0.2 mm$\phi$ and 0.15 mm$\phi$, respectively. 15 Grams of sample fibers each having a length of 15 mm are uniformly set to a slit having a length of 10 mm and a width of 4 mm. From the scattering intensity I of the sample and that I' of amibent air are measured at scattering angles of 1° and 0.5° to calculate a scattering intensity ratio I/I'.

The ceramic fiber of the present invention can be prepared by spinning a polymetallosilazane into fibers and calcining the spun fibers. The polymetallosilazane preferably has a number molecular weight of 200-500,000 and is a product obtained by reacting a polysilazane having a number molecular weight of 100-50,000 and having a main skeletal structure containing the following recurring unit:

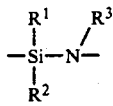

wherein $R^1$, $R^2$ and $R^3$ represent independently from each other hydrogen, a hydrocarbyl group, a group other than the hydrocarbyl group and having a carbon atom bonded to the silicon atom of the above formula, an alkylsilyl group, an alkylamino group or an alkoxy group, with a metal alkoxide of the formula:

$$M(OR^4)_n$$

wherein M is a metal, $R^4$ is hydrogen, an alkyl having 1-20 carbon atoms or an aryl and n is the valence of the metal M with the proviso that at least one of the n number of the $R^4$ is the alkyl or aryl. When n is 2-4, the two or more $R^4$ groups may be the same with each other or may be different from each other.

The hydrocarbyl group may be for example an alkyl, alkenyl, an aryl, a cycloalkyl or aralkyl. Preferably, $R^1$, $R^2$, $R^3$ represent independently from each other hydrogen or an alkyl with 1-5 carbon atoms, more preferably hydrogen, methyl or ethyl, and $R^4$ represents an alkyl with 1-10 carbon atoms, more preferably 1-4 carbon atoms.

The reaction for the formation of the above polymetallosilazane is preferably performed using an inert solvent at a temperature lower than the boiling point of the metal alkoxide. Details of the method for the production of the polymetallosilazane are disclosed in Japanese patent applications No. 61-226,270, No. 61-223,790, and No. 63-68221.

The spinning of the polymetallosilazane may be effected as follows. A viscous spinning solution of the polymetallosilazane in an inert solvent is first prepared, by, for example, simply concentrating a polymetallosilazane-containing reaction solution as obtained in the above-described reaction. Alternatively, the solvent in the reaction solution is evaporated to dryness and the dried product is then dissolved in a suitable amount of a desired solvent. Examples of suitable solvents include hydrocarbons such as pentane, hexane, isohexane, methylpentane, heptane, isoheptane, octane, isooctane, cyclopentane, methylcyclopentane, cyclohexane, methylcyclohexane, benzene, toluene, xylene and ethylbenzene; halogenated hydrocarbons such as methylene chloride, chloroform, carbon tetrachloride, bromoform, ethylene chloride, ethylidene chloride, trichloroethane, tetrachloroethane and chlorobenzene; ethers such as ethyl ether, propyl ether, ethyl butyl ether, butyl ether, 1,2-dioxyethane, dioxane, dimethyldioxane, tetrahydrofuran, tetrahydropyran and anisole; and sulfur compounds such as carbon disulfide, diethylsulfide, thiophene and tetrahydrothiophene.

The amount of the polymetallosilazane in the solution is not critical as long as the solution can exhibit a suitable spinnability. Generally, however, a concentration of 50-98% by weight gives good results. Optimum concentration varies with the number average molecular weight, molecular weight distribution and molecular structure of the polymetallosilazane. While the resulting solution as such exhibits good spinnability suitable for dry spinning, an organic polymer may be added to the solution in a small amount as a spinning assistant for improving the spinnability. Illustrative of suitable spinning assistants are polyethers, polyamides, polyesters, vinyl polymers, polythioethers and polypeptides.

Before spinning, the spinning solution is desirably subjected to defoaming, filtration and other treatments for the removal of gels and foreign matters which will adversely affect the spinnability. The spinning is advantageously effected by a dry spinning method. Alternatively, centrifugal or blow spinning methods can be adopted. In dry spinning, the solution is discharged through a spinning nozzle to a cylinder and the spun fibers are continuously wound around a roll. The nozzle diameter, spinning speed and winding speed vary with the property of the spinning solution and with the intended diameter of the spun fibers. A nozzle diameter of 0.035-0.5 mm, preferably 0.05-0.3 mm and a winding speed of 30-5000 m/min, preferably 60-2500 m/min are generally used. The inside of the cylinder into which the fibers are discharged from the spinning nozzle can be maintained in any desired atmosphere such as air. It is, however, preferable to maintain the inside of the cylinder in a dried air atmosphere, an ammoniacal atmosphere or an inert gas atmosphere for the purpose of controlling the infusiblization and solidification of the spun fibers. Steam or vapors of an inert solvent such as used for the preparation of the spinning solution can also be incorporated into the above atmosphere. The cylinder can be heated to maintain the temperature of the inside of the cylinder in a range so that the solidification of the spun fibers can be suitably controlled. The spinning solution generally is maintained at a temperature of 20°-300° C., preferably 30°-200° C. and the temperature within the cylinder is generally held at a temperature of 20°-300° C., preferably 40°-250° C.

Since the spun fibers wound around the take up roll generally contain the solvent, they are dried in a suitable atmosphere such as in air, vacuum, dried air, ammonia or an inert gas. The drying is suitably performed with heating to accelerate the drying. Good results are obtainable with a heating temperature of 20°-500° C. It is also preferred that the drying be carried out while maintaining the fibers under uniform tension for preventing the drying fibers from twisting and from being curved or bent. The tension is generally in the range of 1 g/mm$^2$ to 50 kg/mm$^2$.

The thus obtained spun fibers are then pyrolized or calcined to form the ceramic fibers. The pyrolysis is preferably carried out in the atmosphere of an inert gas such as nitrogen or argon, ammonia, hydrogen or a mixture thereof, or under vacuum. The pyrolysis causes partial reduction of distances between atoms, which are to constitute the ceramic. This results in the formation of voids in the resulting ceramic fibers and in an increase of an X-ray small angle scattering intensity ratio. Thus, for the purpose of reducing the X-ray small angle scattering intensity ratio, the pyrolysis is preferably carried out at a temperature of 500°-1800° C., more preferably 700°-1600° C. Further, almost all volatile components contained in the fibers are vaporized at a temperature of 300°-600° C. Since too rapid vaporization also causes an increase of the X-ray small angle scattering intensity ratio, it is preferred that the heating of the fibers from 300° C. to 600° C. be carried out at a heating rate of 0.1°–100° C./minute, more preferably 0.1°–20° C./minute.

It is also preferred that the calcination be performed by a method which includes preheating the spun fibers to a temperature of up to 400°–600° C. in the atmosphere of ammonia and, thereafter, heating the preheated fibers to a temperature up to 1200°–1300° C. in the atmosphere of an inert gas, preferably nitrogen. The heat treatment in the ammoniacal atmosphere can reduce the amount of carbon in the ceramic fiber and can increase the N/Si ratio.

It is also advantageous to maintain the fibers under tension of 1 g/mm$^2$ to 50 Kg/mm$^2$ during the pyrolysis step for preventing shrinkage, twisting or bending of the fibers which would otherwise be caused as a result of vaporization of volatile components contained in the fibers.

As a result of the above calcination, there are obtained fibers of a ceramic of a Si-M-N-O system, Si-M-N-C-O-H system or the like system according to the present invention. The ceramic generally shows an amorphous phase or a fine crystallites-containing amorphous phase. Such crystal phase may vary with the calcination conditions such as temperature and heating rate. The atomic ratios N/Si, O/Si, M/Si, C/Si and H/Si of the ceramic may be adjusted by the kind of the polymetallosilazane to be used and the conditions for the calcination of the polymetallosilazane. The kind of the polymetallosilazane varies with the mixing ratio of the raw materials, i.e. polysilazane and metal alkoxide, and the reaction conditions under which the raw materials are reacted.

The ceramic fibers according to the present invention remains amorphous even heated to a high temperature and, thus, have a high mechanical strength, especially a high impact resistance at high temperatures. Even the fibers are heated to such a higher temperature as to form ceramic crystals, the mechanical strength thereof is still far greater than that of known silicon nitride-based ceramic fibers. Further, the ceramic fibers according to the present invention have a high electrical resistance, an extremely low free carbon content and excellent compatibility with matrix materials, especially with metals and, therefore, are particularly useful as reinforcing fibers for fiber-reinforced metal composite materials.

The following examples will further illustrate the present invention.

REFERENCE EXAMPLE 1

Preparation of Perhydropolysilazane

To a four-necked 10 liter flask equipped with a gas feed conduit, a mechanical stirrer and a Dewar condenser, an oxygen-free, dry nitrogen gas was fed to replace the air within the flask therewith. After charging 4900 ml of dry pyridine (deaerated), the flask was cooled in an ice bath. Then 744 g of dichlorosilane were added into the flask to form a white precipitate of adduct (SiH$_2$Cl$_2$·2C$_5$H$_5$N). Subsequently, with stirring and cooling in the ice bath, 735 g of ammonia which had been passed successively through a sodium hydroxide-containing tube and an active carbon-containing tube was bubbled through the reaction mixture within the flask. The reaction was completed by heating the contents in the flask at 100° C. After completion of the reaction, the reaction mixture was centrifuged and the supernatant was washed with dry pyridine, followed by filtration in a nitrogen atmosphere to give 5100 ml of a filtrate containing perhydropolysilazane. When the solvent was removed from the filtrate (5 ml) by evaporation in vacuo, 0.249 g of resinous solid was obtained. Gel permeation chromatography of the polysilazane revealed that the polysilazane had a number-average molecular weight of 980. Dried o-xylene was then added to the filtrate and the mixture was distilled in vacuo to obtain 5000 ml of an o-xylene solution containing 5.8% by weight of the perhydropolysilazane.

EXAMPLE 1

To a four-necked 2 liter flask equipped with a gas feed conduit, a magnetic stirrer, a seal cap and a Dewar condenser, a dry argon gas was fed to replace the air within the flask therewith. After charging 14.7 g (72 mmol) of aluminum triisopropoxide, the 5.8 weight % solution of perhydropolysilazane in a dry o-xylene, obtained in Reference Example 1, was fed to the flask using a syringe with stirring to obtain a homogeneous solution. The solution was then heated at 80° C. for 2 hours with stirring in the atmosphere of argon. As a result, the colorless solution became light yellow. Gel permeation chromatography using a polystyrene as a standard revealed the formation of polyaluminosilazane having a number-average molecular weight of 1750 and a weight-average molecular weight of 14500.

The thus obtained solution of the polyaluminosilazane was mixed with 5.0% by weight (based on the polyaluminosilazane) of polyethylmethacrylate (molecular weight: 340000) and the mixture was stirred for 1 hour. Thereafter, the mixture was concentrated using a rotary evaporator to remove the solvent. The solvent removal was continued until the solution became suited for spinning. The spinning solution was then charged to a defoaming vessel of a dry spinning device and was allowed to quiescently stand at 60° C. for about 2 hours for defoaming. The spinning solution was then discharged at 30° C. through a nozzle with an orifice diameter of 0.1 mm to a spinning cylinder maintained at 130° C. under ambient air, while continuously winding the spun fibers around a roller at a rate of 300 m/min. The thus obtained precursor fibers had an average diameter of 10 μm. The fibers were then heated from room temperature to 1350° C. at a heating rate of 180° C./hour in a nitrogen atmosphere while applying a tension of 500 g/mm$^2$ thereto, thereby obtaining silicon nitride-based ceramic fibers having the physical properties shown below.

Tensile strength: 210–360 kg/mm$^2$ (average 280 kg/mm$^2$)
Modulus: 21–67 ton/mm$^2$ (average 26 ton/mm$^2$)
Atomic ratio:
  N/Si: 1.03
  C/Si: 0.64
  O/Si: 0.33
  H/Si: 0.57
  Al/Si: 0.05
Elementary analysis (wt %):
  Si: 48.6, Al: 2.5, N: 25.1, O: 9.3, C: 13.5, H: 1.0.

EXAMPLE 2

To a four-necked, 2 liter flask equipped with a gas feed conduit, a magnetic stirrer, a seal cap and a Dewar condenser, a dry nitrogen gas was fed to replace the air within the flask therewith. After charging 1000 g of the 5.8 weight % solution of perhydropolysilazane, obtained in Reference Example 1, to the flask, a solution of titanium tetraisopropoxide (7.0 g, 24.6 mmol) in 6.5 ml of dry xylene was fed to the flask using a syringe with stirring. The reaction solution was changed from colorless to light brown, purple and finally black as the reaction proceeded. After completion of the reaction, the solvent was removed by distillation in vacuo to obtain, as a dark brown solid, polytitanosilazane with a yield of 84.0%. Gel permeation chromatography using a polystyrene as a standard revealed that the product had a number-average molecular weight of 1800 and a weight-average molecular weight of 15000.

The thus obtained polytitanosilazane was dissolved in dry xylene, with which was mixed 5.0% by weight (based on the polytitanosilazane) of polyethylmethacrylate (molecular weight: 340000) and the mixture was stirred for 1 hour. The solution was then concentrated using a rotary evaporator to remove the solvent. The solvent removal was continued until the solution became suited for spinning. The spinning solution was then charged to a defoaming vessel of a dry spinning device and was allowed to quiescently stand at 60° C. for about 2 hours for defoaming. The spinning solution was then discharged at 30° C. through a nozzle with an orifice diameter of 0.1 mm to a spinning cylinder maintained at 130° C. under ambient air, while continuously winding the spun fibers around a roller at a rate of 300 m/min. The thus obtained fibers had an average diameter of 10 μm. The fibers were then heated from room temperature to 1350° C. in a nitrogen atmosphere at a heating rate of 180° C./hour while applying a tension of 500 g/mm$^2$ thereto, thereby obtaining silicon nitride-based ceramic fibers having the physical properties shown below.

Tensile strength: 220-360 kg/mm$^2$ (average 290 kg/mm$^2$)
Modulus: 22-70 ton/mm$^2$ (average 28 ton/mm$^2$)
Atomic ratio:
 N/Si: 0.95
 C/Si: 0.35
 O/Si: 0.28
 H/Si: 0.46
 Ti/Si: 0.02
Elementary analysis (wt %):
 Si: 54.5, Ti: 1.8, N: 25.9, O: 8.7, C: 8.1, H: 1.9.

The thus obtained ceramic fibers were further heated from room temperature to 1500° C. at a heating rate of 180° C./hour. The X-ray diffraction analysis revealed that the resultant ceramic fibers were still amorphous.

EXAMPLE 3

To a four-necked, 2 liter flask equipped with a gas feed conduit, a magnetic stirrer, a seal cap and a Dewar condenser, a dry nitrogen gas was fed to replace the air within the flask therewith. After charging 1000 g of the 5.8 weight % solution of perhydropolysilazane, obtained in Reference Example 1, to the flask, a solution of zirconium tetraisopropoxide (18.3 g, 0.055 mmol) in 100 ml of dry o-xylene was added to the flask with stirring and the mixture was reacted at 130° C. in the atmosphere of nitrogen. Gel permeation chromatography using a polystyrene as a standard revealed that the product had a number-average molecular weight of 1850. The thus obtained polyzirconosilazane solution was then concentrated using a rotary evaporator to remove the solvent. The solvent removal was continued until the solution became suited for spinning. The spinning solution was then charged to a defoaming vessel of a dry spinning device and was allowed to quiescently stand at 60° C. for about 2 hours for defoaming. The spinning solution was then discharged at 60° C. through a nozzle with an orifice diameter of 0.1 mm to a spinning cylinder maintained at 120° C. under ambient air, while continuously winding the spun fibers around a roller at a rate of 500 m/min. The thus obtained precursor fibers had an average diameter of 8 μm. The fibers were then heated from room temperature to 1350° C. in a nitrogen atmosphere at a heating rate of 180° C./hour while applying a tension of 500 g/mm$^2$ thereto, thereby obtaining silicon nitride-based ceramic fibers having the physical properties shown below. The X-ray diffraction analysis revealed that the ceramic fibers were amorphous.

Tensile strength: 200-320 kg/mm$^2$ (average 275 kg/mm$^2$)
Modulus: 22-74 ton/mm$^2$ (average 29 ton/mm$^2$)
Atomic ratio:
 N/Si: 1.0
 C/Si: 0.44
 O/Si: 0.24
 H/Si: 0.55
 Zr/Si: 0.04
Elementary analysis (wt %):
 Si: 50.4, Zr: 7.0, N: 25.2, O: 9.5, C: 6.9, H: 1.0.

EXAMPLE 4

The spun fibers of polytitanosilazane obtained in Example 2 were heated from room temperature to 1350° C. in an ammoniacal atmosphere at a heating rate of 180° C./hour while applying a tension of 500 g/mm$^2$ thereto, thereby obtaining silicon nitride-based ceramic fibers having the physical properties shown below. The X-ray diffraction analysis revealed that the ceramic fibers were amorphous.

Tensile strength: 200-350 kg/mm$^2$ (average 295 kg/mm$^2$)
Modulus: 23-72 ton/mm$^2$ (average 28 ton/mm$^2$)
Atomic ratio:
 N/Si: 1.22
 O/Si: 0.28
 Ti/Si: 0.02
Elementary analysis (wt %):
 Si: 55.3, Ti: 1.8, N: 34.0, O: 8.7, C: below 0.1, H: below 0.1.

COMPARATIVE EXAMPLE

A pyridine solution (1000 ml) containing the perhydropolysilazane, obtained in Reference Example 1, was placed in a 2 liter autoclave and heated at 120° C. for 3 hours in a nitrogen atmosphere under autogeneous pressure. A large amount of a gas was found to be produced and the pressure within the autoclave was increased by 2.0 kg/cm$^2$ as a result of the reaction. After cooling to room temperature, the pressure within the autoclave was released while feeding a nitrogen gas, and 1000 ml of ethylbenzene was mixed to the reaction mixture. The mixture was then distilled at 70° C. under vacuo to leave white powder (reformed perhydropolysilazane) having a number-average molecular weight of 2500.

Toluene was then added little by little to the reformed product for dissolution until there was obtained a solution exhibiting a desired spinnability. The solution was then charged to a defoaming vessel of a dry spinning device and was allowed to quiescently stand at 60° C. for about 4 hours for defoaming. The spinning solution was then discharged at 40° C. through a nozzle with an orifice diameter of 0.08 mm to a spinning cylinder maintained at 100° C. in the atmosphere of argon, while continuously winding the spun fibers around a roller at a rate of 1000 m/min. The thus obtained fibers had an average diameter of 10 μm. The fibers were then heated from room temperature to 1350° C. at a heating rate of 180° C./hour in a nitrogen atmosphere while applying a tension of 500 g/mm$^2$ thereto, thereby obtaining silicon nitride-based ceramic fibers having the physical properties shown below.

Tensile strength: 150–230 kg/mm$^2$ (average 200 kg/mm$^2$)
Modulus: 15–32 ton/mm$^2$ (average 20 ton/mm$^2$)
Crystal phase: amorphous (weak diffraction pattern attributed to alpha-type silicon nitride crystals was observed)
Atomic ratio:
  N/Si: 0.96
  C/Si: 0.02
  O/Si: 0.07
  H/Si: 0.08
Elementary analysis (wt %):
  Si: 65.4, N: 31.4, O: 2.5, C: 0.5, H: 0.2.

EXAMPLE 5

The spun fibers of polyaluminosilazane obtained in Example 1 were heated from room temperature to 600° C. in an ammoniacal atmosphere and to 1300° C. at a heating rate of 300° C./hour while applying a tension of 500 g/mm$^2$ thereto, thereby obtaining silicon nitride-based ceramic fibers having the physical properties shown below.

Tensile strength: 180–350 kg/mm$^2$ (average 280 kg/mm$^2$)
Modulus: 20–65 ton/mm$^2$ (average 25 ton/mm$^2$)
Crystal phase: amorphous;
X-ray small angle scattering intensity ratio:
  1°: 7.5
  0.5°: 6.2
Atomic ratio (based on elementary analysis):
  N/Si: 1.02
  C/Si: 0.64
  O/Si: 0.35
  H/Si: 0.07
  Al/Si: 0.09

The thus obtained silicon nitride-based ceramic fibers were woven to form a plain weave cloth, and then impregnated with a commercially available epoxy resin (Bisphenol A-type resin) followed by deaeration at about 40° C. and pre-curing at about 95° C., thereby to obtain prepreg sheets. These sheets were laminated, treated by a hot press at a pressure of 30 kg/cm$^2$ to remove an excess resin and heated at 170° C. for 4 hours for curing. The resulting composite sheet had a resin content of 60 vol. %, a tensile strength of 90 kg/mm$^2$, a modulus of 11.0 ton/mm$^2$, an interlayer shearing strength of 12.9 kg/mm$^2$ and a specific resistivity of 10$^{14}$ ohm.cm.

EXAMPLE 6

The spun fibers obtained in Example 2 were heated from room temperature to 600° C. in an ammoniacal atmosphere and to 1100° C. at a heating rate of 300° C./hour while applying a tension of 500 g/mm$^2$ thereto, thereby obtaining silicon nitride-based ceramic fibers having the physical properties shown below.

Tensile strength: 210–350 kg/mm$^2$ (average 285 kg/mm$^2$)
Modulus: 20–65 ton/mm$^2$ (average 29 ton/mm$^2$)
Crystal phase: amorphous
X-ray small angle scattering intensity ratio:
  1°: 9.3
  0.5°: 7.0
Atomic ratio (based on elementary analysis):
  N/Si: 0.96
  C/Si: 0.31
  O/Si: 0.22
  H/Si: 0.07
  Ti/Si: 0.02

The thus obtained silicon nitride-based ceramic fibers were cut into a length of 6 mm and mixed homogeneously with Nylon 6,6 powder. The mixture was then shaped into a sheet with a hot press machine at 290° C. and 150 kg/cm$^2$. The resulting composite sheet had a resin content of 50 vol. %, a tensile strength of 12.4 kg/mm$^2$, a modulus of 2.5 ton/mm$^2$, and a specific resistivity of 10$^{15}$ ohm.cm.

COMPARATIVE EXAMPLE 1

A composite sheet was prepared in the same manner as that in Example 5 except that carbon fibers were used in place of the ceramic fibers. The physical properties of the fibers and the composite sheet are summarized below.

Carbon Fibers

Tensile strength: average 276 kg/mm$^2$
Modulus: average 27 ton/mm$^2$
X-ray small angle scattering intensity ratio:
  1°: 70
  0.5°: 100

Composite Sheet

Tensile strength: 73 kg/mm$^2$
Modulus: 6.7 ton/mm$^2$
Inter-layer shearing strength: 6.4 kg/mm$^2$
Specific resistivity: 8.2×10$^{-1}$ ohm.cm

COMPARATIVE EXAMPLE 2

A composite sheet was prepared in the same manner as that in Example 6 except that carbon fibers were used in place of the ceramic fibers. The physical properties of the fibers and the composite sheet are summarized below.

Carbon Fibers

Tensile strength: average 278 kg/mm$^2$
Modulus: average 27 ton/mm$^2$
X-ray small angle scattering intensity ratio:
  1°: 70
  0.5°: 100

Composite Sheet

Tensile strength: 7.8 kg/mm$^2$
Modulus: 1.8 ton/mm$^2$
Specific resistivity: 6.5×10$^{-2}$ ohm.cm From the results shown in Examples 5 and 6 and Comparative Examples 1-2, it is appreciated that the composite materials of the present invention have superior tensile strength, modulus and inter-layer shearing strength in comparison with conventional ones. In particular, the composite laminate sheets of the present invention exhibit excellent inter-layer shearing strength, indicating the excellent compatibility of the ceramic fibers of the present invention. The high resistivity of the composite sheets according to the present invention indicates that they are suited as a lightweight, insulating material.

EXAMPLE 7

The silicon nitride-based ceramic fibers obtained in Example 5 were placed on a pure aluminum foil having a thickness of 0.5 mm with their axes being in parallel with each other. After covering the surface of the fiber layer with another aluminum foil, it was passed between a pair of heat rollers of 670° C. to obtain a laminate. Such laminates (27 sheets) were superimposed one over another, heated at 670° C. for 10 minutes under vacuum, and then pressed at 600° C. using a hot press machine to obtain a silicon nitride fiber-reinforced composite aluminum material in which the fibers are distributed in the matrix of aluminum. The composite material contained 30% by volume of the fibers and had a tensile strength of 80 kg/mm$^2$ and modulus of 11 ton/mm$^2$. The observation of the cross section of the composite material by a scanning electron microscope showed that the fibers were in close contact with the metal matrix without any substance in the interface.

COMPARATIVE EXAMPLE 3

Example 7 was repeated in the same manner as described except that commercially available silicon carbide fibers having the properties shown below were used in place of the ceramic fibers obtained in Example 5.

Silicon Carbide Fibers

Tensile strength: average 250 kg/mm$^2$
Modulus: average 20 ton/mm$^2$
X-ray small angle scattering intensity ratio:
1°: 14.3
0.5°: 7.2
Atomic ratio:
C/Si: 1.25
O/Si: 0.44

The composite material contained 30% by volume of the fibers and had a tensile strength of 36 kg/mm$^2$ and modulus of 6.9 ton/mm$^2$. The low mechanical strengths of the composite material are considered to be attributed to the reduction of the mechanical strengths of the conventional silicon carbide fibers during the heat treatment at 670° C. in the presence of molten aluminum.

EXAMPLE 8

The silicon nitride-based ceramic fibers obtained in Example 6 were arranged into a sheet-like form with their axes being oriented in parallel with each other, over which titanium metal was covered by means of a melt-injection device to a thickness of 0.1–10 μm. The resulting sheets were superimposed one over the other while filling the interstices between them with titanium powder. The resultant laminate was subjected to press molding for consolidation and the consolidated body was pre-calcined at 520° C. for 3 hours in the atmosphere of hydrogen and then subjected to hot press at 1150° C. for 3 hours under 200 kg/cm$^2$ in the atmosphere of argon, thereby to obtain silicon nitride fiber-reinforced titanium composite material. This composite material contained 45% by volume of the fibers and had a tensile strength of 165 kg/mm$^2$ and modulus of 17 ton/mm$^2$.

COMPARATIVE EXAMPLE 4

Example 8 was repeated in the same manner as described except that commercially available silicon carbide fibers as used in Comparative Example 3 were used in place of the ceramic fibers obtained in Example 6. The composite material contained 30% by volume of the fibers and had a tensile strength of 112 kg/mm$^2$ and modulus of 17 ton/mm$^2$.

EXAMPLE 9

The silicon nitride-based ceramic fibers obtained in Example 5 were cut into a length of 10 mm and the chopped fibers (45 volume %) were mixed with borosilicate glass powder (7740) with an average diameter of 44 μm. The mixture was dispersed in isopropanol to form a slurry. The silicon nitride-based ceramic fibers obtained in Example 5 were arranged into a sheet-like form with their axes being in parallel with each other. The resulting fiber layer was covered with a layer of the above slurry. Such fiber layers and the slurry layers were alternately overlaid, and the resulting laminate was dried and press molded by a hot press machine at a pressure of 750 kg/cm$^2$ and a temperature of 1350° C. for 10 minutes in the atmosphere of argon, thereby to obtain a composite material. The composite material had an anti-bending strength of 18.7 kg/mm$^2$ at room temperature. For the purpose of comparison, the above procedure was repeated in the same manner as described except that commercially available silicon carbide fibers were used in place of the ceramic fibers obtained in Example 5. This composite material had an anti-bending strength of 14 kg/mm$^2$ at room temperature.

EXAMPLE 10

The polytitanosilazane fibers obtained in Example 6 (15 volume %) were mixed in an alumina ball mill with a mixture containing 98 parts by weight of Al$_2$O$_3$ particles with a diameter of 0.5 μm and 2 parts by weight of TiO$_2$. As a result, the fibers in the thus obtained mixture had an average length of about 0.5 mm. This mixture was then pyrolized and sintered in a hot press machine at 2000° C. to obtain a silicon nitride fiber-reinforced, sintered alumina plate with a size of 40×10×3 mm. Then, the plate was subjected to a spalling test which was conducted by heating the plate in a furnace at 1500° C. for 20 minutes and immediately forcibly cooling the heated plate. Such a heating and cooling treatment was repeated until cracks were formed in the plate. The repetition number was 10 in the above sintered alumina plate. For the purpose of comparison, a sintered alumina plate was prepared in the same manner as described above except that no fibers were added. Spalling test for this comparative sample revealed that the formation of cracks when the heating and cooling treatment was repeated twice.

As will be appreciated from the foregoing, the inorganic fibers according to the present invention have both a high tensile strength and a modulus. Preferred physical properties of the inorganic fibers of the present invention are as summarized below:

| Physical property | Preferred | More Preferred |
|---|---|---|
| Tensile strength (Kg/mm$^2$) | 100–450 | 200–450 |
| Modulus (ton/mm$^2$) | 10–90 | 20–90 |
| Diameter (μm) | 3–30 | 3–20 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A ceramic silicon nitride fiber containing Si, N, O and at least one metal M in amounts providing the following atomic ratios:
N/Si: 0.3 to 3,
O/Si: 0.001 to 15,
M/Si: 0.01 to 5,
said ceramic exhibiting an X-ray small angle scattering such that the ratio of the intensity of the small angle scattering of the fibers to that of air is 1 to 20, said fiber being produced by a process comprising:
providing a polymetallosilazane having a number molecular weight of 200–500,000 and which is a product obtained by reacting a polysilazane having a number average molecular weight of 100–50,000 and having a main skeletal structure containing the following recurring unit:

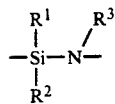

wherein $R^1$, $R^2$ and $R^3$ represent independently from each other hydrogen, hydrocarbyl, a group other than hydrocarbyl having a carbon atom bonded to the silicon atom of the above formula, alkylsilyl, alkylamino or alkoxy, with a metal alkoxide of the formula:

wherein M is a metal, $R^4$ is hydrogen, alkyl having 1–20 carbon atoms or aryl and n is the valence of the metal M with the proviso that at least one of the n number of the $R^4$ is alkyl or aryl;
spinning said polymetallosilazane into fibers; and calcining said fibers.

2. An silicon nitride as set forth in claim 1, wherein said ceramic further contains C and H in amounts providing the following atomic ratios:
C/Si: 0.001–7,
H/Si: 0.001–15.

3. An silicon nitride as set forth in claim 1, wherein the atomic ratios are as follows:
N/Si: 1 to 1.3,
O/Si: 0.01 to 4,
M/Si: 0.01 to 1.

4. An silicon nitride as set forth in claim 3, wherein said ceramic further contains C and H in amounts providing the following atomic ratios:
C/Si: 0.01–3.5, and
H/Si: 0.01–1.

5. An silicon nitride as set forth in claim 1, wherein said metal is selected from those of the groups IIa, IIIa, IIIb, IVa IVb, Va and Vb of the Periodic Table.

6. An silicon nitride as set forth in claim 5, wherein said metal is selected from Be, Mg, Ca, Sr, Ba, Sc, Y, lanthanoid elements, actinoid elements, B, Al, Ga, In, Tl, Ti, Zr, Hf, Ge, Sn, Pb, V, Nb, Ta, As, Sb, and Bi.

7. An silicon nitride as set forth in claim 5, wherein said metal is selected from Y, B, Al, Ti and Zr.

8. An silicon nitride as set forth in claim 1, wherein the ratio of the intensity of the small angle scattering of the fibers to that of air is 1 to 10.

9. An silicon nitride as set forth in claim 8, wherein the ratio of the intensity of the small angle scattering of the fibers to that of air is 1 to 5.

10. An silicon nitride as set forth in claim 1, and having a tensile strength of 100–450 Kg/mm² and a modulus of 10–90 ton/mm².

11. An silicon nitride as set forth in claim 1, and having a diameter of 3–30 μm.

12. An silicon nitride as set forth in claim 1, and having a tensile strength of 200–450 Kg/mm² and a modulus of 20–90 ton/mm².

13. An silicon nitride as set forth in claim 1, and having a diameter of 3–20 μm.

14. An silicon nitride as set forth in claim 1, wherein said ceramic is amorphous.

15. An silicon nitride as set forth in claim 1, wherein said ceramic is amorphous but contains fine ceramic crystallites dispersed in the amorphous domain.

16. A composite material comprising a matrix material, and inorganic fibers according to claim 1 embedded within said matrix material.

17. A composite material as set forth in claim 16, wherein said matrix material is a metal, a synthetic resin or a ceramic.

* * * * *